(12) United States Patent
Murata et al.

(10) Patent No.: US 9,724,862 B2
(45) Date of Patent: Aug. 8, 2017

(54) MOLD CLAMPING APPARATUS (71) Applicant: NISSEI PLASTIC INDUSTRIAL CO., LTD., Nagano (JP)

(72) Inventors: Atsushi Murata, Nagano (JP); Daiki Tanemura, Nagano (JP); Hozumi Yoda, Nagano (JP); Nobusuke Takahashi, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 0 days.

(21) Appl. No.: 15/245,436

(22) Filed: Aug. 24, 2016

(65) Prior Publication Data
US 2017/0057143 A1 Mar. 2, 2017

(30) Foreign Application Priority Data

Aug. 27, 2015 (JP) .................. 2015-168014

(51) Int. Cl.
*B29C 45/17* (2006.01)
*B29C 45/67* (2006.01)
(52) U.S. Cl.
CPC .......... *B29C 45/67* (2013.01); *B29C 45/1747* (2013.01); *B29C 45/1751* (2013.01); *B29C 45/6721* (2013.01); *B29C 45/6728* (2013.01)
(58) Field of Classification Search
CPC . B29C 45/1747; B29C 45/1751; B29C 45/67; B29C 45/6721; B29C 45/6728
See application file for complete search history.

(56) References Cited

U.S. PATENT DOCUMENTS 6,655,949 B2 * 12/2003 Chikazawa ......... B29C 45/6707
425/190

FOREIGN PATENT DOCUMENTS

JP  11-235741  *  8/1999

OTHER PUBLICATIONS

English-language translation of Japanese Patent No. JP 5084797, Patent date Nov. 28, 2012.
Abstract, Japanese Publication No. 2011-037187, Publication Date Feb. 24, 2011.

* cited by examiner

*Primary Examiner* — James Mackey
(74) *Attorney, Agent, or Firm* — Adams & Wilks

(57) ABSTRACT

A mold clamping apparatus includes a fixed platen, a mold clamping cylinder, a movable platen moved by the mold clamping cylinder toward the fixed platen, and a mold opening/closing actuator for moving the movable platen or the mold clamping cylinder. The mold clamping apparatus further includes a mold thickness adjustment cylinder provided between the mold clamping cylinder and the movable platen, the mold thickness adjustment cylinder being configured to generate an axial force larger than an axial force in an expanding direction of the mold opening/closing actuator and smaller than an axial force in a contracting direction of the mold clamping cylinder.

2 Claims, 9 Drawing Sheets

MOLD CLAMPING APPARATUS

FIELD OF THE INVENTION

The present invention relates to an improvement in a mold clamping apparatus mounted on a horizontal injection molding machine.

BACKGROUND OF THE INVENTION

Horizontal injection molding machines mainly comprise a mold clamping apparatus for clamping a mold, and an injecting apparatus for injecting a resin material into the clamped mold. The mold is opened when a molded product is taken out. Generally, mold opening is performed by operating a mold opening/closing actuator which is provided separately from a mold clamping cylinder.

The mold opening/closing actuator has a longer stroke and a smaller cylinder diameter compared to the mold clamping cylinder. When the molded product is large in size, a large mold opening force is required. To increase the mold opening force, it is considered that the cylinder diameter of the mold opening/closing actuator is increased, which, however, makes the mold opening/closing actuator expensive. As one of other measures, a technique is disclosed which allows an initial stage of a mold opening process to be performed by the action of the mold clamping cylinder without increasing the cylinder diameter of the mold opening/closing actuator, for example, in Japanese Patent (JP-B) No. 5084797.

Figure 9:
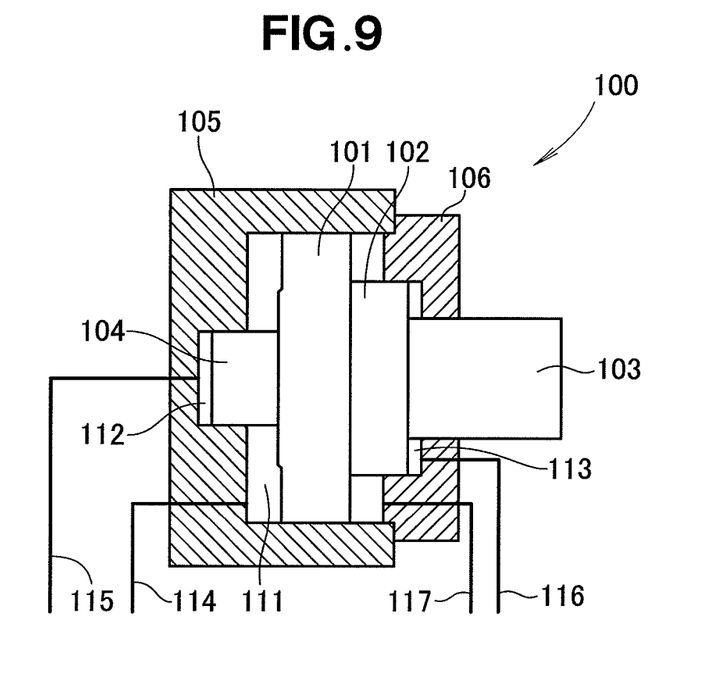
FIG. 9 is a cross-sectional view of a conventional mold clamping cylinder.

The prior art invention disclosed in JP 5084797 B will be described below with reference to FIG. 9. As shown in FIG. 9, a conventional mold clamping cylinder 100 includes a large-diameter piston 101, a medium-diameter piston 102 disposed adjacent to the large-diameter piston 101, a piston rod 103 extending from the medium-diameter piston 102, a small-diameter rod 104 extending from the large-diameter piston 101, a case 105 with a bottom for movably receiving therewithin the large-diameter piston 101 and the small-diameter rod 104, and a lid 106 for covering an opening of the case 105.

In a mold clamping process, pressure oil is supplied to a large-diameter oil chamber 111 formed behind the large-diameter piston 101 and a small-diameter oil chamber 112 formed behind the small-diameter rod 104, whereby the piston rod 103 is moved forward. In an initial stage of a mold opening process, pressure oil is supplied to a medium-diameter oil chamber 113 formed in front of the medium-diameter piston 102, whereby the piston rod 103 is moved rearward. The medium-diameter piston 102 generates a sufficiently large mold opening force. Since the medium-diameter piston 102 has a smaller diameter compared to the large-diameter piston 101, the medium-diameter oil chamber 113 has a relatively small diameter, and thus the piston rod 103 is moved rearward at a speed faster than that in the mold clamping process.

However, since the medium-diameter piston 102 and the medium-diameter oil chamber 113 need to be provided, the structure of the conventional mold clamping cylinder 100 is inevitably complicated. Additionally, four oil passages 114, 115, 116, 117 are needed. Thus, in comparison to a common cylinder having a single piston and two oil passages, the conventional mold clamping cylinder 100 becomes complicated and expensive.

To respond to a demand for cost reduction of the mold clamping apparatus, an improved mold clamping apparatus is required which is capable of boosting the mold opening force in the initial stage of the mold opening process while suppressing cost increase.

SUMMARY OF THE INVENTION

It is therefore an object of the present invention to provide a mold clamping apparatus capable of boosting a mold opening force in an initial stage of a mold opening process while suppressing cost increase.

According to one aspect of the present invention, there is provided a mold clamping apparatus comprising: a base; a fixed platen fixedly mounted on the base and supporting a fixed mold; a mold clamping cylinder disposed parallel to the fixed platen and horizontally movably supported on the base, the mold clamping cylinder having a piston rod extending toward the fixed mold; a movable platen disposed between the fixed platen and the mold clamping cylinder and connected to the piston rod in such a manner as to be horizontally movably supported, the movable platen supporting a movable mold; tie bars extending horizontally from the fixed platen and penetrating the movable platen and the mold clamping cylinder; a connecting mechanism arbitrarily connecting the mold clamping cylinder or the fixed platen to the tie bars; and a mold opening/closing actuator for moving the mold clamping cylinder or the movable platen, wherein a mold thickness adjustment cylinder is provided between the mold clamping cylinder and the movable platen, the mold thickness adjustment cylinder being configured to change a position of the movable platen with respect to the mold clamping cylinder when the fixed mold and the movable mold are replaced and to generate a predetermined mold opening force in an initial stage of a mold opening process, and wherein an axial force in a contracting direction of the mold thickness adjustment cylinder is set to be larger than an axial force in an expanding direction of the mold opening/closing actuator and smaller than an axial force in a contracting direction of the mold clamping cylinder.

The axial force in the contracting direction of the mold thickness adjustment cylinder is set to be larger than the axial force in the expanding direction of the mold opening/closing actuator and smaller than the axial force in the contracting direction of the mold clamping cylinder, and the mold thickness adjustment cylinder is configured to generate the mold opening force in the initial stage of the mold opening process. That is, the mold thickness adjustment cylinder is used also for mold opening. As the mold thickness adjustment cylinder, a conventional mold thickness adjustment cylinder can be utilized. As a result, it is possible to provide the mold clamping apparatus capable of boosting the mold opening force in the initial stage of the mold opening process while suppressing cost increase.

When the mold thickness adjustment cylinder is used in the initial stage of the mold opening process because of a large-sized molded product or any other reason, an initial part of mold opening is performed first by the mold thickness adjustment cylinder, then the connecting mechanism is set in an unlocked state, and then the rest part of the mold opening is performed quickly by operating the mold opening/closing actuator.

When the mold thickness adjustment cylinder is not used in the initial stage of the mold opening process because of a small-sized molded product or any other reason, first the connecting mechanism is set in an unlocked state, and then the whole of mold opening is performed quickly by operating the mold opening/closing actuator. In this case, cycle time is shortened and productivity can thereby be enhanced. Thus, according to the present invention, the mold clamping apparatus can be suitable for multiple uses.

Preferably, the axial force in the contracting direction of the mold thickness adjustment cylinder is set within a range of 2 to 4 times the axial force in the expanding direction of the mold opening/closing actuator. By thus setting the axial force in the contracting direction of the mold thickness adjustment cylinder, it is possible to boost the mold opening force while maintaining the proper size and price of the mold thickness adjustment cylinder.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
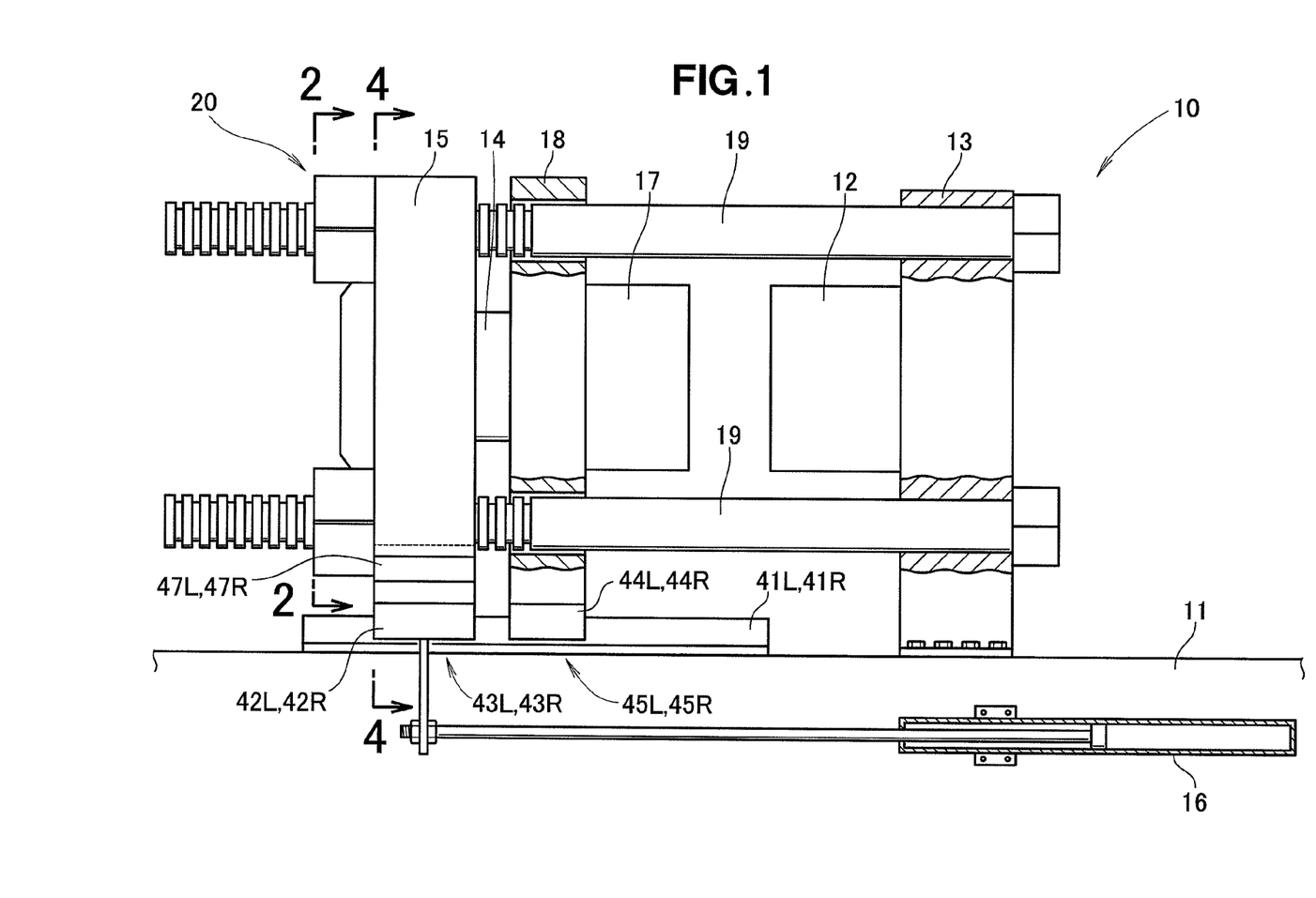
FIG. 1 is a side view of a mold clamping apparatus according to the present invention.

As shown in FIG. 1, a mold clamping apparatus 10 includes a base 11, a fixed platen 13 fixedly mounted on the base 11 and supporting a fixed mold 12, a mold clamping cylinder 15 disposed parallel to the fixed platen 13 and horizontally movably supported on the base 11, the mold clamping cylinder 15 having a piston rod 14 extending toward the fixed mold 12, a mold opening/closing actuator 16 for moving the mold clamping cylinder 15, a movable platen 18 disposed between the fixed platen 13 and the mold clamping cylinder 15 and connected to the piston rod 14 in such a manner as to be horizontally movably supported on the base 11, the movable platen 18 supporting a movable mold 17, tie bars 19, 19 extending horizontally from the fixed platen 13 and penetrating the movable platen 18 and the mold clamping cylinder 15, and a connecting mechanism 20 arbitrarily connecting the mold clamping cylinder 15 to the tie bars 19, 19.

Any of a hydraulic cylinder and an electric cylinder may be used as the mold opening/closing actuator 16.

Figure 2:
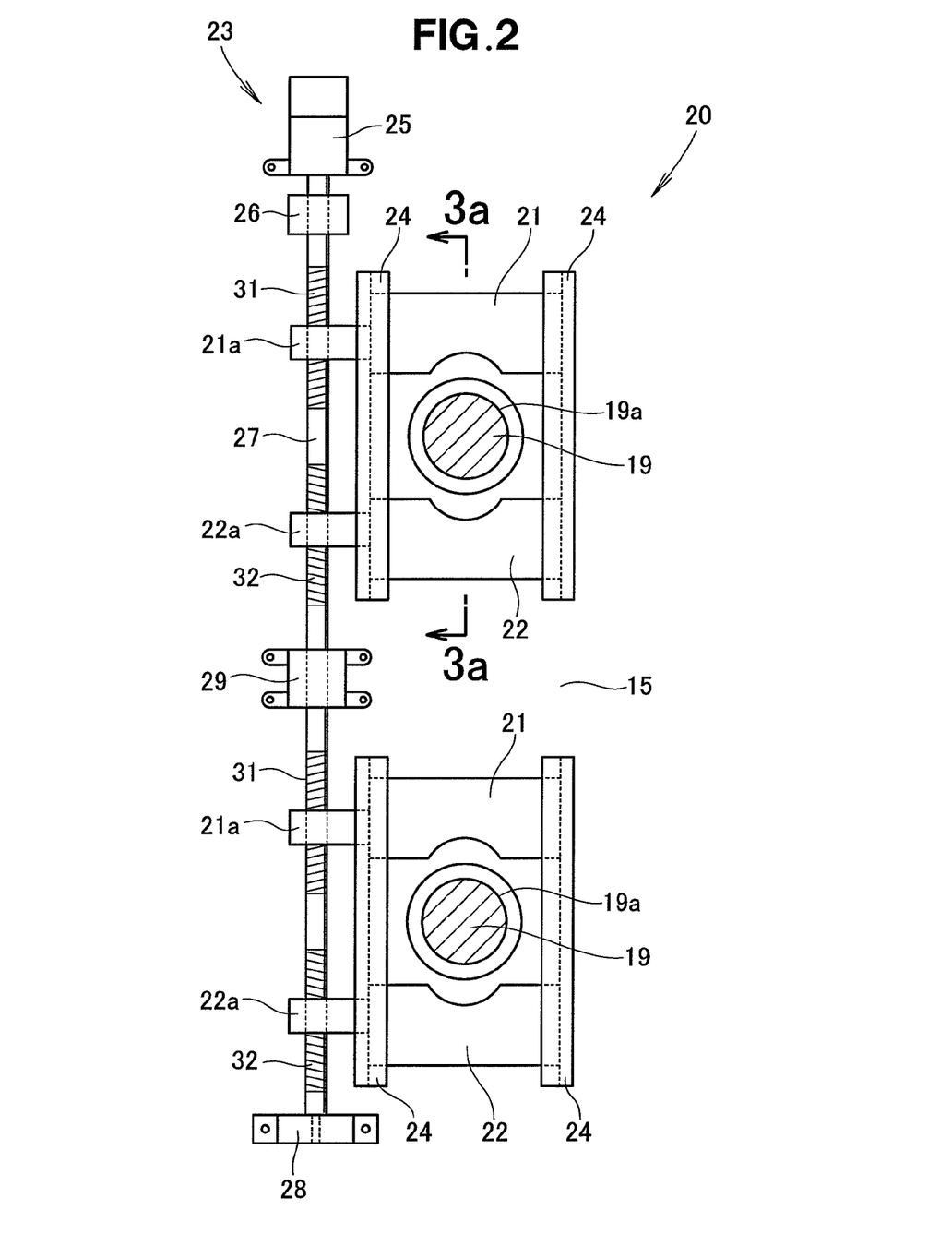
FIG. 2 is a view taken in a direction of arrows 2-2 of FIG. 1.

As shown in FIG. 2, the connecting mechanism 20 includes circumferential grooves 19a formed on each of the tie bars 19, lock plates 21, 22 formed to be fitted with a selected one of the circumferential grooves 19a, and a lock plate moving actuator 23 for moving the lock plates 21, 22 in a direction perpendicular to an axis of the tie bar 19. The lock plates 21, 22 are guided by guides 24, 24 each having an L-shaped cross section so as to prevent movement of the lock plates 21, 22 in an axial direction of the tie bar 19.

The lock plate moving actuator 23 consists of a servo motor 25, and a screw shaft 27 driven by the servo motor 25 via a coupling 26. A lower end and an intermediate portion of the screw shaft 27 are supported by bearing stands 28, 29, respectively. The screw shaft 27 has right screws 31 and left screws 32 formed thereon. A nut 21a extending from the upper lock plate 21 is threadedly engaged with the right screw 31, and a nut 22a extending from the lower lock plate 22 is threadedly engaged with the left screw 32. When the screw shaft 27 is rotated forward, the upper and lower lock plates 21, 22 are synchronously moved closer to the circumferential grooves 19a. When the screw shaft 27 is rotated backward, the upper and lower lock plates 21, 22 are synchronously moved away from the circumferential grooves 19a.

Figure 3A:
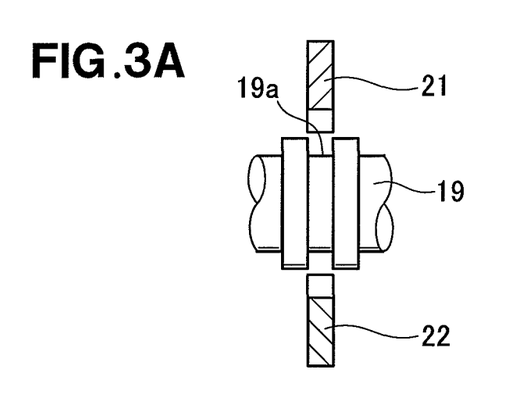
FIGS. 3A and 3B are cross-sectional views taken along line 3a-3a of FIG. 2, showing an operation of the mold clamping apparatus.
Figure 3B:
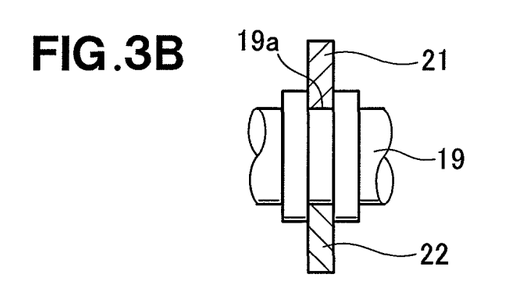

The upper and lower lock plates 21, 22 shown in FIG. 3A are moved closer to a selected one of the circumferential grooves 19a, and fitted with the selected one of the circumferential grooves 19a as shown in FIG. 3B. In this state, the mold clamping cylinder 15 shown in FIG. 1 is integrated with the tie bars 19. Conversely, in FIG. 3A, the mold clamping cylinder 15 shown in FIG. 1 is movable separately from the tie bars 19.

Figure 4:
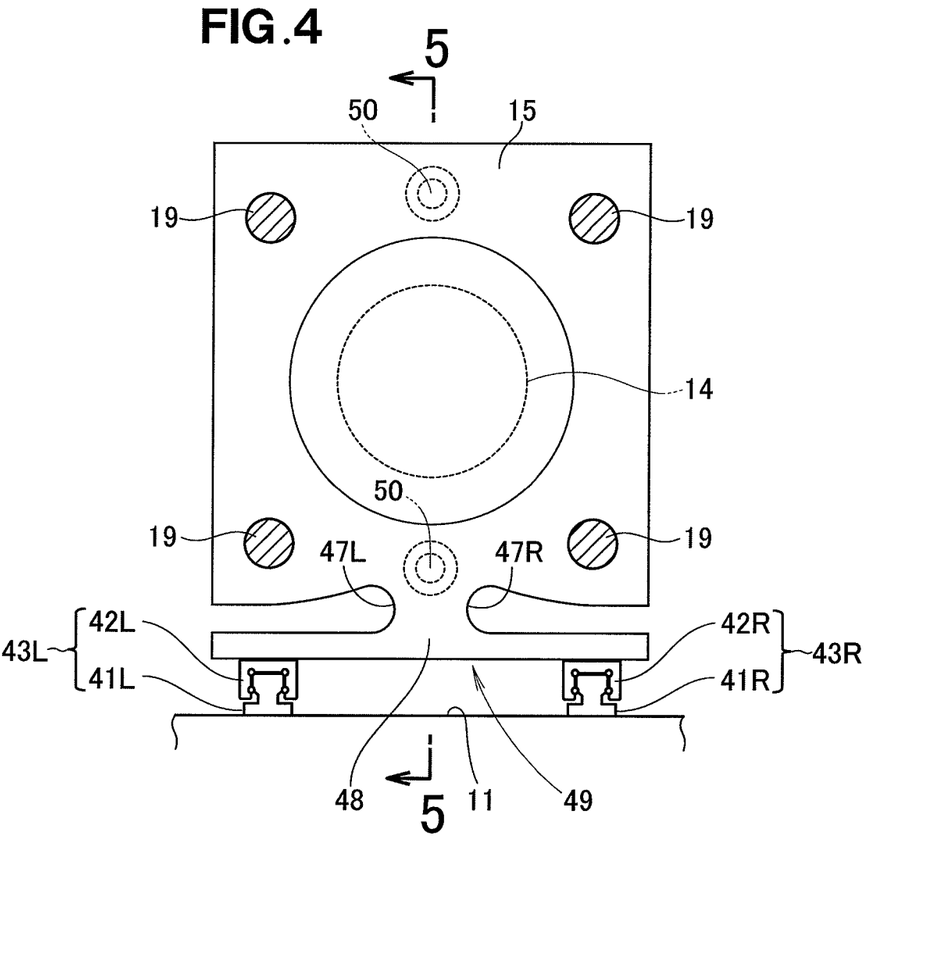
FIG. 4 is a view taken in a direction of arrows 4-4 of FIG. 1.

As shown in FIG. 4, the mold clamping cylinder 15 is supported by the base 11 via left and right linear guide mechanisms 43L, 43R (suffixes "L" and "R" represent "left" and "right", respectively, and the same applies hereinbelow) with built-in rolling elements. The left and right linear guide mechanisms 43L, 43R with the built-in rolling elements include left and right rails 41L, 41R laid on the base 11, and left and right sliders 42L, 42R linearly slidably fitted with the left and right rails 41L, 41R, respectively, via the rolling elements (steel balls or steel rollers) built in therebetween.

As shown in FIG. 1, the movable platen 18 is also supported by the base 11 via left and right linear guide mechanisms 45L, 45R with built-in rolling elements. The left and right linear guide mechanisms 45L, 45R with the built-in rolling elements include the left and right rails 41L, 41R, and left and right sliders 44L, 44R linearly slidably fitted with the left and right rails 41L, 41R, respectively, via the rolling elements built in therebetween.

Note that the movable platen 18 may be guided by left and right rails provided separately from the left and right rails 41L, 41R on the base 11. Further, the left and right sliders 42L, 42R may have extension portions which are extended by a certain length toward the fixed platen 13 and provided with rails laid thereon, and the left and right sliders 44L, 44R may be fitted with these rails. That is, the movable platen 18 may be movably supported directly by the base 11 via the left and right rails 41L, 41R, or may be movably supported indirectly by the base 11 via the extension portions and the additional rails. In other words, a structure for movably supporting the movable platen 18 can be arbitrary, as long as the movable platen 18 is disposed between the fixed platen 13 and the mold clamping cylinder 15, connected to the piston rod 14 in such a manner as to be horizontally movably supported, and supporting the movable mold 17.

As shown in FIG. 4, the left and right upper tie bars 19, 19 and the left and right lower tie bars 19, 19 penetrate through the mold clamping cylinder 15 which is supported by the base 11 via the left and right linear guide mechanisms 43L, 43R with the built-in rolling elements. Note that the tie bars 19 may consist of a single upper tie bar and two lower tie bars.

The mold clamping cylinder 15 includes, in a region thereof located below the left and right lower tie bars 19, 19 and above the left and right sliders 42L, 42R, a left grooved portion 47L opened leftward and elongated horizontally, a right grooved portion 47R opened rightward and elongated horizontally, and a leg portion 48 formed between the left and right grooved portions 47L, 47R. The left and right grooved portions 47L, 47R and the leg portion 48 together form a constricted part 49.

Further, the mold clamping cylinder 15 is provided with mold thickness adjustment cylinders 50, 50 arranged at an intermediate position between the upper tie bars 19, 19 and an intermediate position between the lower tie bars 19, 19 and extending in a depth direction of the sheet, i.e. toward the movable platen.

Figure 5:
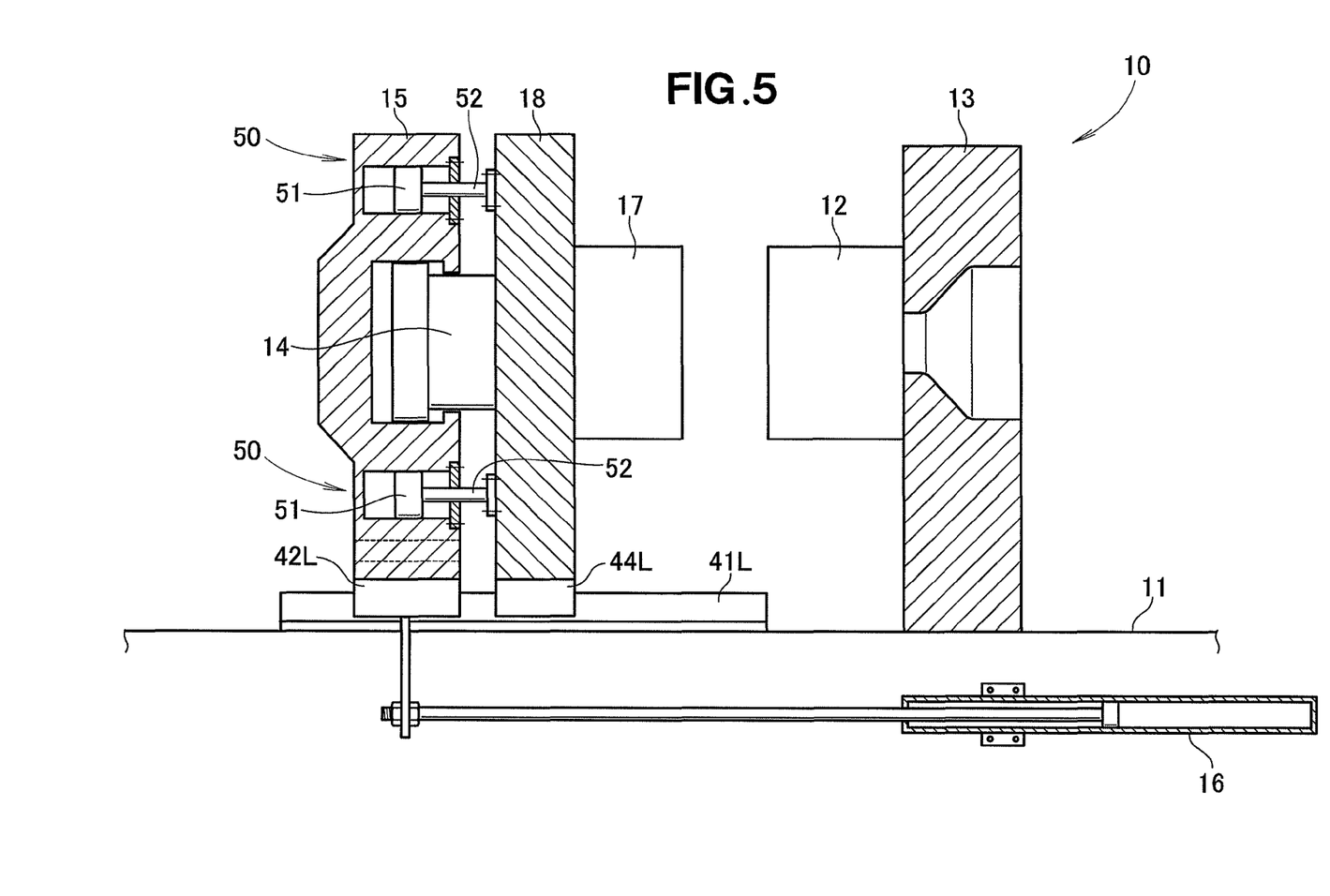
FIG. 5 is a cross-sectional view taken along line 5-5 of FIG. 4.

As shown in FIG. 5, the mold thickness adjustment cylinders 50 each include a piston 51 horizontally movably received within the mold clamping cylinder 15, and a piston rod 52 extending horizontally from the piston 51 and connected to the movable platen 18.

When the fixed mold 12 and the movable mold 17 are replaced, a mold closing position between the fixed mold 12 and the movable mold 17 is changed, and the lock plates 21, 22 of the connecting mechanism 20 are not fitted with the circumferential grooves 19a of the tie bars 19. Therefore, positional adjustment is performed by operating the mold opening/closing actuator 16 to close the fixed mold 12 and the movable mold 17, and then expanding and contracting the mold thickness adjustment cylinders 50 to move the mold clamping cylinder 15 with respect to the movable platen 18. The lock plates 21, 22 of the connecting mechanism 20 are thereby fitted with the circumferential grooves 19a of the tie bars 19. Thus, the mold thickness adjustment cylinders 50 are used for positional adjustment according to the thicknesses of the fixed mold 12 and the movable mold 17 so that the lock plates 21, 22 of the connecting mechanism 20 are fitted with the circumferential grooves 19a of the tie bars 19.

Below will be described axial forces of the mold clamping cylinder 15, the mold opening/closing actuator 16, and the mold thickness adjustment cylinders 50.

Firstly, the mold thickness adjustment cylinders 50 shown in FIG. 5 fulfill two roles, i.e. a role of mold thickness adjustment and a role of mold opening in an initial stage of a mold opening process. In a mold thickness adjustment process, an axial load applied to the piston rod 52 is small. In the initial stage of the mold opening process, the piston rod 52 is moved in a expanding direction, and thus there is no fear of buckling of the piston rod 52. Therefore, the piston rod 52 can have a sufficiently small diameter with respect to the piston 51.

Next, with a specific example, a quantitative explanation will be given of an axial force in a contracting direction of the mold thickness adjustment cylinders 50 being set to be larger than an axial force in an expanding direction of the mold opening/closing actuator 16 and smaller than an axial force in a contracting direction of the mold clamping cylinder 15.

The mold clamping cylinder 15 has a cylinder inside diameter of 70 cm with the piston rod 14 having a diameter of 56 cm. A pressure-receiving area of the mold clamping cylinder 15 in the contracting direction is obtained by $\pi \cdot (70^2 - 56^2)$. Each of the mold thickness adjustment cylinders 50 has a cylinder inside diameter of 18 cm (=outside diameter of the piston 51) with the piston rod 52 having a diameter of 10 cm. A pressure-receiving area of the mold clamping cylinder 15 in the contracting direction is obtained by $\pi \cdot (18^2 - 10^2)$. Each of the mold opening/closing actuators 16 has a cylinder inside diameter of 10 cm, and a pressure-receiving area thereof in the expanding direction is obtained by $\pi \cdot (10^2)$. Consequently, a relationship between the pressure-receiving areas is expressed by an equation $(70^2 - 56^2) : (18^2 - 10^2) : 10^2 = 17.6/2.24/1$. Thus, their relative pressure-receiving areas are obtained.

Herein, the mold clamping apparatus include one mold clamping cylinder, two mold thickness adjustment cylinders 50, and two mold opening/closing actuators 16. When pressure oil having the same pressure is supplied to the mold clamping cylinder 15, the mold thickness adjustment cylinders 50, and the mold opening/closing actuators 16, their relative axial forces are expressed by 8.8/2.24/1.

Thus, the axial force in the contracting direction of the mold thickness adjustment cylinders 50 is larger than the axial force in the expanding direction of the mold opening/closing actuators 16 and smaller than the axial force in the contracting direction of the mold clamping cylinder 15. In the above example, the axial force in the contracting direction of the mold thickness adjustment cylinders 50 is 2.24 times the axial force in the expanding direction of the mold opening/closing actuators 16, whereby mold opening can be reliably performed even when a molded product is large in size.

Figure 6:
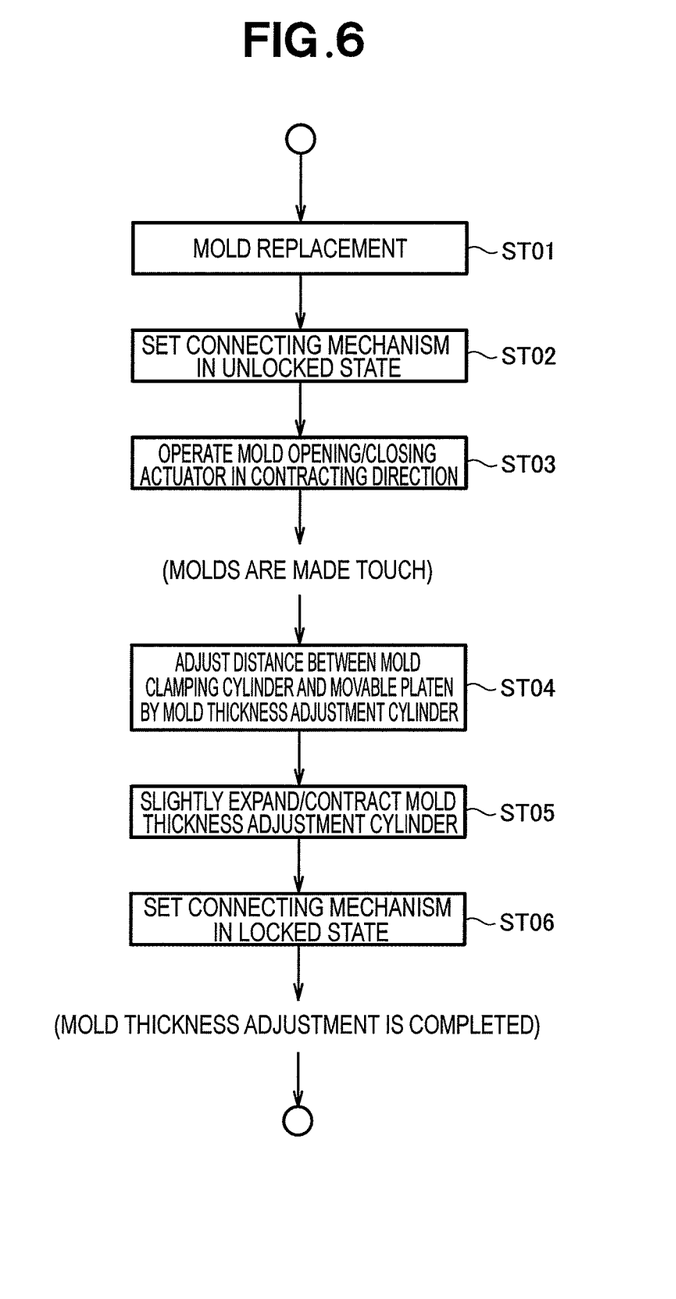
FIG. 6 is a flowchart showing a mold thickness adjustment process.

Below will be described an operation of the mold clamping apparatus 10 having the above-described configuration. As shown in FIG. 6, first, the molds are replaced (ST01). More specifically, referring also to FIG. 1, the fixed mold 12 and the movable mold 17 are replaced by desired ones.

Next, the connecting mechanism is set in an unlocked state (ST02). The connecting mechanism 20 shown in FIG. 1 is unlocked to allow the mold clamping cylinder 15 to move. The mold opening/closing actuator is then operated in a contracting direction (ST03). The movable platen 18 shown in FIG. 1 is moved together with the mold clamping cylinder 15 toward the fixed platen 13, whereby the movable mold 17 is abutted on the fixed mold 12. In other words, the molds are made touch.

Next, according to the changed thicknesses of the molds, a distance between the mold clamping cylinder and the movable platen is adjusted by the mold thickness adjustment cylinders (ST04). The mold thickness adjustment cylinders

TABLE 1

| reference numeral | name | cylinder inside diameter | piston rod diameter | relative pressure-receiving areas | number of pieces | relative axial forces |
|---|---|---|---|---|---|---|
| 15 | mold clamping cylinder | 70 cm | 56 cm | contracting direction 17.6 | 1 | 8.8 |
| 50 | mold thickness adjustment cylinder | 18 cm | 10 cm | contracting direction 2.24 | 2 | 2.24 |
| 16 | mold opening/closing actuator | 10 cm | — | expanding direction 1 | 2 | 1 | are then slightly moved as needed (ST05). More specifically, the mold thickness adjustment cylinders 50, 50 shown in FIG. 5 are slightly expanded and contracted so that the lock plates 21, 22 are fitted with the circumferential grooves 19a shown in FIG. 3A. In this step, the mold clamping cylinder 15 is slightly moved with respect to the movable platen 18 resting still. In this manner, the lock plates 21, 22 are fitted with the circumferential grooves 19a shown in FIG. 3A. Note that ST05 may be included in ST04 and performed simultaneously.

In the state of fitting, the connecting mechanism is set in a locked state (ST06). The mold thickness adjustment is thereby completed.

Figure 7:
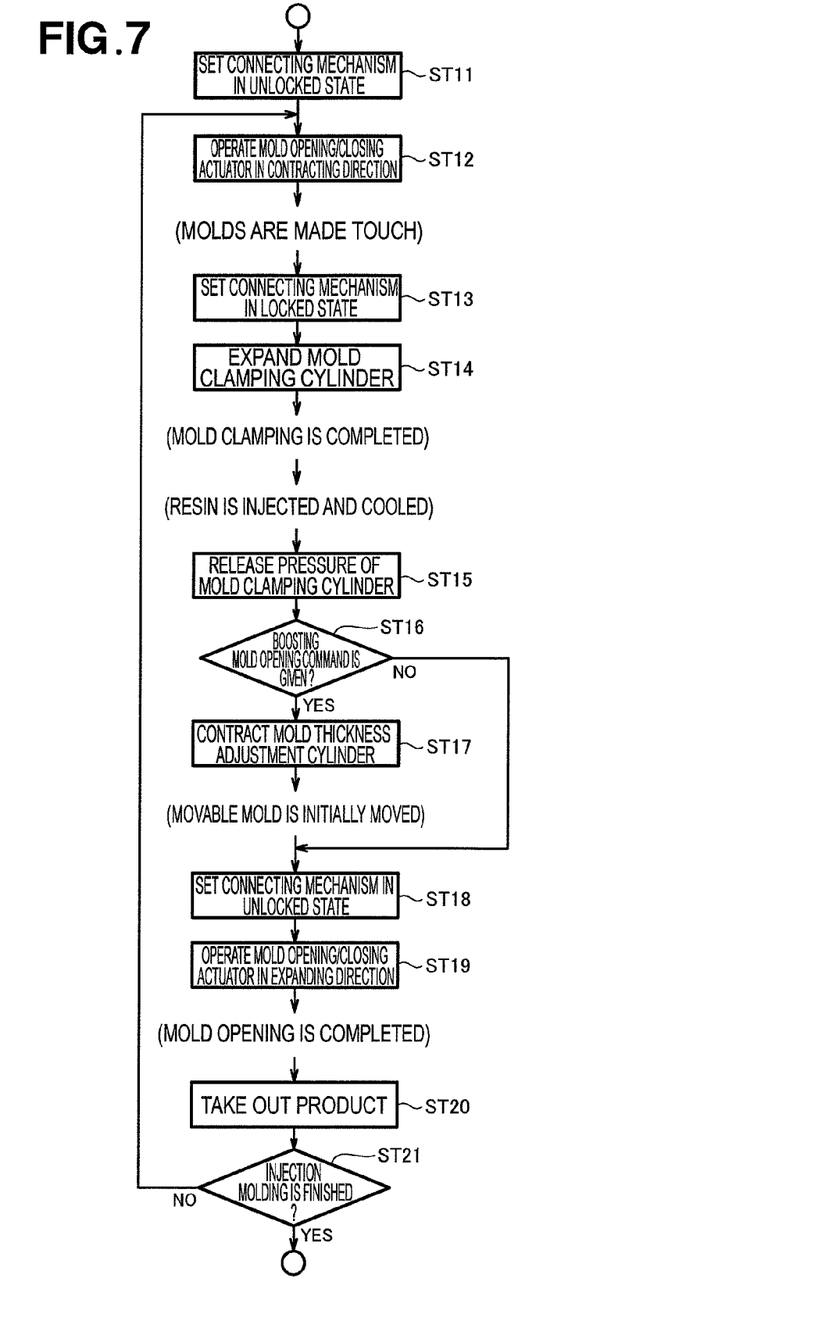
FIG. 7 is a flowchart showing a mold clamping process and an injection molding process.

Next will be described processes of mold clamping and injection molding with reference to FIG. 7. As shown in FIG. 7, the connecting mechanism is set in the unlocked state (ST11), the mold opening/closing actuator is operated in the contracting direction (ST12), and the molds are made touch. More specifically, referring also to FIG. 1, the connecting mechanism 20 is unlocked to allow the mold clamping cylinder 15 to move, and the mold opening/closing actuator is operated in the contracting direction. The movable platen 18 is thereby moved together with the mold clamping cylinder 15 toward the fixed platen 13, and the movable mold 17 is abutted on the fixed mold 12.

The connecting mechanism is set in the locked state (ST13). The mold clamping cylinder is thereby integrated with the tie bars. In this state, the mold clamping cylinder is expanded (ST14). Mold clamping process is thereby completed. A resin is injected in the molds and cooled.

Next, pressure of the mold clamping cylinder is released (ST15). Pressure oil supplied to the mold clamping cylinder 15 shown in FIG. 5 is discharged. The piston rod 14 is thereby allowed to move. In ST16 shown in FIG. 7, it is determined whether a command for mold opening with boosted force, i.e. boosting mold opening command, is given or not. When the boosting mold opening command is given, the step advances to ST17 and the mold thickness adjustment cylinders are contracted (ST17). When the mold thickness adjustment cylinders 50 are contracted, the movable platen 18 and the movable mold 17 is pulled by a large force, whereby the initial stage of the mold opening process is performed. Note that the boosted force is set within a range of 2 to 4 times the axial force of the mold opening/closing actuator, and does not have to be simply 2 or 4 times.

The boosting mold opening is useful when a molded resin product is large in size and a large mold opening force is required. When an ordinary mold opening force is insufficient, mold opening cannot be sufficiently performed or it takes a longer time. By the boosting mold opening, quick and reliable mold opening can be performed. However, a stroke of the mold thickness adjustment cylinders is short, and not long enough to perform a predetermined mold opening.

Thus, the connecting mechanism is set in the unlocked state (ST18), and the mold opening/closing actuator is operated in the expanding direction (ST19). In FIG. 1, by operating the mold opening/closing actuator 16 in the expanding direction, the movable mold 17 can be fully separated from the fixed mold 12. After the mold opening is completed, the product is taken out (ST20). By the series of steps described above, the injection molding process is completed. In ST21, if the injection molding process is to be continued, the step returns to ST 12. If the injection molding process is to be finished, the flow is finished.

In ST16, when the boosting mold opening command is not given (NO), the step skips to ST18 without carrying out ST17.

Figure 8:
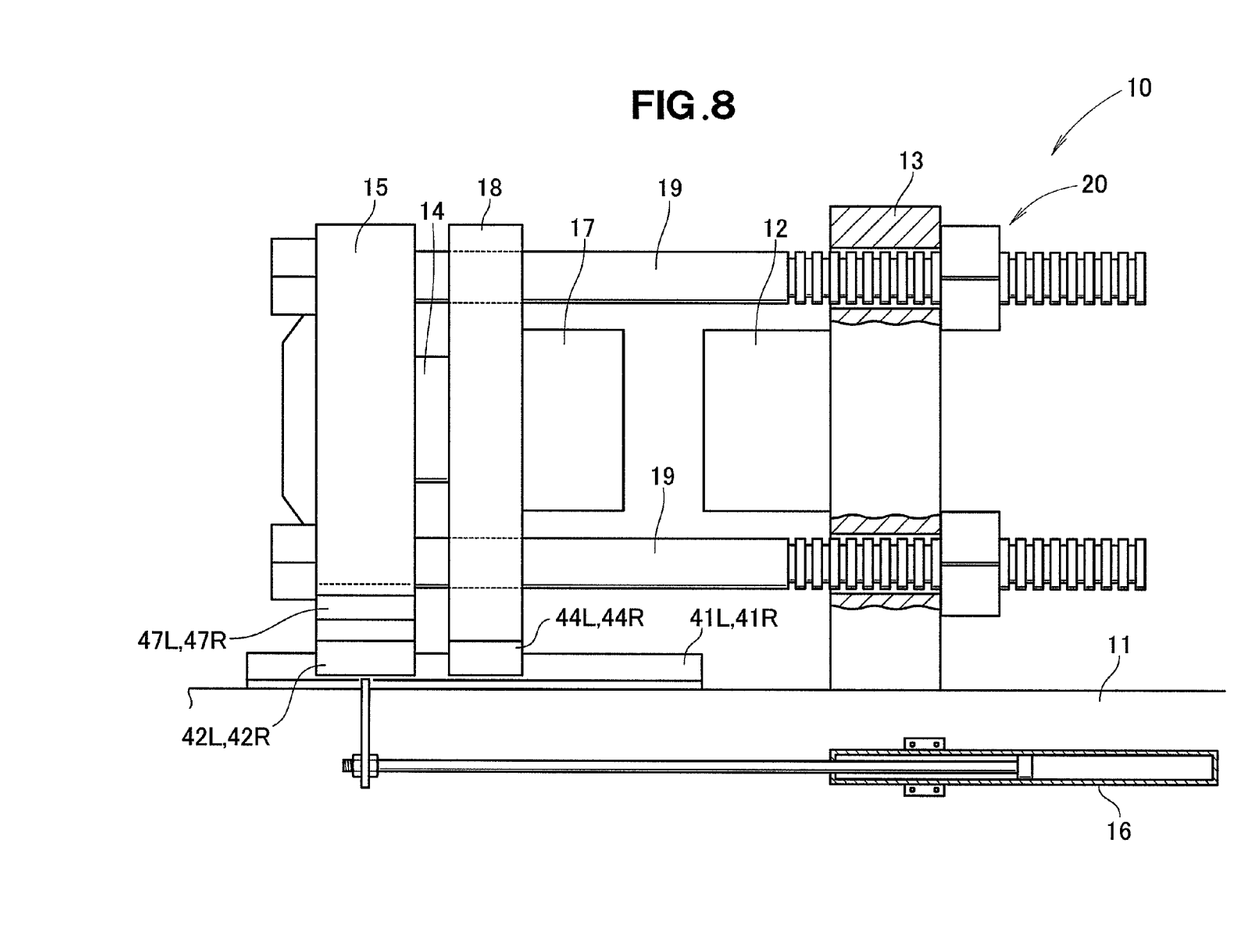
FIG. 8 is a view showing a mold clamping apparatus of a modified embodiment.

As shown in FIG. 8, the connecting mechanism 20 may be arranged on the fixed platen 13. In this configuration, the tie bars 19, 19 are moved horizontally together with the mold clamping cylinder 15. Since the rest of the configuration is identical to that shown in FIG. 1, the same reference numerals of FIG. 1 are used for the shared elements, and a detailed description thereof will be omitted.

Further, although the mold opening/closing actuator 16 is mechanically connected to the mold clamping cylinder 15 as shown in FIGS. 8 and 1, the mold opening/closing actuator 16 may be connected to the movable platen 18. It is because the movable platen 18 and the mold clamping cylinder 15 are mechanically connected with each other via the mold thickness adjustment cylinders 50.

As described above, in FIG. 5, the axial force in the contracting direction of the mold thickness adjustment cylinders 50 is 2.24 times the axial force in the expanding direction of the mold opening/closing actuators 16. It should be noted, however, that the relative ratio may be modified within a range of 2.0 to 4.0. If the relative ratio is less than 2, the mold opening force would be insufficient for a large-sized molded product. If the relative ratio is more than 4, the cylinder diameter has to be increased by 2 times or more, leading to a proportionate increase in size and cost of the mold thickness adjustment cylinders.

In order to boost the mold opening force while maintaining the proper size and price of the mold thickness adjustment cylinders, it is recommended that the axial force in the contracting direction of the mold thickness adjustment cylinders be set within the range of 2 to 4 times the axial force in the expanding direction of the mold opening/closing actuator.

Obviously, various minor changes and modifications of the present invention are possible in light of the above teaching. It is therefore to be understood that within the scope of the appended claims the invention may be practiced otherwise than as specifically described.

What is claimed is:

1. A mold clamping apparatus comprising:
   a base;
   a fixed platen fixedly mounted on the base and supporting a fixed mold;
   a mold clamping cylinder disposed parallel to the fixed platen and horizontally movably supported on the base, the mold clamping cylinder having a piston rod extending toward the fixed mold;
   a movable platen disposed between the fixed platen and the mold clamping cylinder and connected to the piston rod in such a manner as to be horizontally movably supported, the movable platen supporting a movable mold;
   tie bars extending horizontally from the fixed platen and penetrating the movable platen and the mold clamping cylinder;
   a connecting mechanism arbitrarily connecting the mold clamping cylinder or the fixed platen to the tie bars; and
   a mold opening/closing actuator for moving the mold clamping cylinder or the movable platen,
   wherein a mold thickness adjustment cylinder is provided between the mold clamping cylinder and the movable platen, the mold thickness adjustment cylinder being configured to change a position of the movable platen with respect to the mold clamping cylinder when the fixed mold and the movable mold are replaced and to generate a predetermined mold opening force in an initial stage of a mold opening process, and wherein an axial force in a contracting direction of the mold thickness adjustment cylinder is set to be larger than an axial force in an expanding direction of the mold opening/closing actuator and smaller than an axial force in a contracting direction of the mold clamping cylinder.

2. The mold clamping apparatus according to claim 1, the axial force in the contracting direction of the mold thickness adjustment cylinder is set within a range of 2 to 4 times the axial force in the expanding direction of the mold opening/closing actuator.

* * * * *